US009702700B2

(12) United States Patent
Lefevre et al.

(10) Patent No.: US 9,702,700 B2
(45) Date of Patent: Jul. 11, 2017

(54) FIBRE-OPTIC INTERFEROMETRIC MEASUREMENT DEVICE COMPRISING A RING RESONATOR, GYROMETER AND INERTIAL ATTITUDE OR NAVIGATION UNIT COMPRISING SUCH A DEVICE

(71) Applicant: IXBLUE, Marly le Roi (FR)

(72) Inventors: Herve Lefevre, Paris (FR); Frederic Guattari, Aubervilliers (FR); Cedric Molucon, Paris (FR); Joachin Honthaas, Paris (FR); Eric Ducloux, Rueil Malmaison (FR); Jean-Jacques Bonnefois, Saint-Cloud (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 14/774,540

(22) PCT Filed: Mar. 10, 2014

(86) PCT No.: PCT/FR2014/050540
§ 371 (c)(1),
(2) Date: Sep. 10, 2015

(87) PCT Pub. No.: WO2014/140466
PCT Pub. Date: Sep. 18, 2014

(65) Prior Publication Data

US 2016/0025494 A1 Jan. 28, 2016

(30) Foreign Application Priority Data

Mar. 11, 2013 (FR) ..................................... 13 52161

(51) Int. Cl.
*G01C 19/72* (2006.01)

(52) U.S. Cl.
CPC ................................. *G01C 19/727* (2013.01)

(58) Field of Classification Search
CPC ...... G01C 19/64; G01C 19/72; G01C 19/721; G01C 19/722

(Continued)

(56) References Cited

U.S. PATENT DOCUMENTS 5,137,356 A * 8/1992 Malvern ............. G01C 19/727 356/461
5,305,087 A * 4/1994 Bernard ............... G01C 19/727 356/461

(Continued)

OTHER PUBLICATIONS

Jeng-Nan Juang et al.: "Evaluation of Ring Laser and Fiber Optic Gyroscope Technology", Feb. 3, 2011 (Feb. 3, 2011), XP055094113, Retrieved from the Internet: URL:http://www.asee.org/documents/sections /middle-atlantic/fall-2009/01-Evaluation-of-Ring-Laser-And-Fiber-Optic-Gyroscope-Technology.pdf [retrieved on Dec. 18, 2013] figures 3,4.

(Continued)

*Primary Examiner* — Jonathan Hansen
(74) *Attorney, Agent, or Firm* — Young & Thompson

(57) ABSTRACT

A fiber-optic interferometric measurement device (100) intended to measure a physical parameter (ΩR), includes: a wide-spectrum light source (103); a SAGNAC fiber-optic interferometer (110), in which there propagate two counter-propagating light waves (101, 102) including measurement elements (1140) sensitive to the physical parameter that results in a non-reciprocal phase difference $\Delta\phi_p$ between the two light waves; and a detector (104) delivering an electric signal representative of the physical parameter. The measurement elements include a ring resonator (1143) in transmission mode including a first coupler (1141) and a second coupler (1142) respectively, which couple a first arm (111) and a second arm (112) respectively of the SAGNAC (Continued)

interferometer to the ring resonator, in such a way that the two light waves travel in opposing directions of travel (1143H, 1143AH).

17 Claims, 6 Drawing Sheets

(58) Field of Classification Search
USPC .................................................. 356/460, 461
See application file for complete search history.

(56) References Cited

U.S. PATENT DOCUMENTS 5,327,215 A * 7/1994 Bernard ............... G01C 19/727 356/461
7,777,889 B2 * 8/2010 Qiu ........................ G01C 19/64 356/460
2009/0046294 A1 * 2/2009 Kaplan .................. G01C 19/72 356/460

OTHER PUBLICATIONS

Xijing Wang et al.: "Resonator fiber optic gyro with bipolar digital Serrodyne Modulation Scheme", Proceedings of SPIE, vol. 8421, Oct. 15, 2012 (Oct. 15, 2012), pp. 84210A-84210A-4, XP055094121, ISSN: 0277-786X, DOI: 10.1117/12.2005968 the whole document.
Hajime Kato et al: "Shupe effect compensation of temperature controlled Fiber Optical Gyroscope", Advanced Motion Control, 2010 11th IEEE International Workshop On, IEEE, Piscataway, NJ, USA, Mar. 21, 2010 (Mar. 21, 2010), pp. 262-267, XP031675968, ISBN: 978-1-4244-6668-9 the whole document.
International Search Report, dated Jun. 6, 2014, from corresponding PCT application.

* cited by examiner 110
1141C
1143A1
1144
1143A
1143H
1140
1143A2
1142C
1142D
1141D
1141
1142
1143
1141A
1142A
102-k
101-k
1141B
1143B
1143AH
1142B
102-3
102-1
102-2
101-3
101-2
101-1
111
112
102
101
113Y
113B
113C
113
122
113A
110B
110A
$110_{OUT}$
$110_{IN}$
105B
105
105A
105C
103A
103F
103
104
121
$\Omega_R$
100

310
1143A1
1144
1143A
1143H
3140
1143A2
1142C
1141C
1141D
1142D
1141
2144
1143
1142
1141A
1142A
102-k
101-k
1141B
3151
1143B1
1143AH
1143B
1143B2
3152
1142B
300
102-3
101-3
102-2
102-1
101-2
101-1
111
102
102
112
101
113Y
101
113B
113C
113
122
113A
110B
110A
$110_{OUT}$
$110_{IN}$
105B
105
105A
105C
103A
103F
103
104
121
$\Omega_R$

FIBRE-OPTIC INTERFEROMETRIC MEASUREMENT DEVICE COMPRISING A RING RESONATOR, GYROMETER AND INERTIAL ATTITUDE OR NAVIGATION UNIT COMPRISING SUCH A DEVICE

The present invention relates to a fibre-optic interferometric measurement device intended to measure a physical parameter.

It relates more particularly to an interferometric measurement device including a SAGNAC interferometer that comprises measurement means sensitive to the physical parameter to be measured.

The invention finds a particularly advantageous application in the making of a gyrometer comprising such an interferometric measurement device and in the making of an inertial attitude or navigation unit using such a gyrometer.

A fibre-optic interferometric measurement device intended to measure a physical parameter is known from the document "*The Fiber-Optic Gyroscope*" (H. LEFÈVRE, Artech House, 1993—see in particular FIG. 3.26 page 54).

As shown in FIG. 1, this interferometric measurement device 1000 includes:

- a light source 1003 emitting a source light signal 1003A,
- a fibre-optic SAGNAC interferometer 1010, in which propagate a first light wave 1001 and a second light wave 1002, which are counter-propagating, said SAGNAC interferometer 1010 comprising:
  - an input port 1010A receiving, in a forward direction, an input light signal,
  - a splitter 1013 connected, on the one hand, to said input port 1010A and, on the other hand, to a first arm 1011 and to a second arm 1012 of said SAGNAC interferometer 1010,
  - measurement means 1014 sensitive to said physical parameter to be measured, said physical parameter generating a non-reciprocal phase difference $\Delta\phi_p$, which is function of said physical parameter, between said two counter-propagating light waves 1001, 1002, and
  - an output port 1010B, common with said input port 1010A, transmitting, in a return direction opposite to the forward direction, an output light signal having an output light power that is function of the total phase difference $\Delta\phi_t$ between said two counter-propagating light waves,
- an optical radiation detector 1004, receiving said output light power exiting from said SAGNAC interferometer 1010 and delivering an electric signal representative of the output light power, and
- a source coupler 1005 that couples, in said forward direction, said light source 1003 to said input port 1010A of the SAGNAC interferometer 1010, and in said return direction, said output port 1010B of the SAGNAC interferometer 1010 to said detector 1004.

Such an interferometric measurement device 1000 may for example be used in an interferometric fibre-optic gyrometer or "I-FOG".

As known, and as shown in FIG. 1, the measurement means 1014 of the interferometric measurement device 1000 according to the prior art may comprise a fiber-optic coil-rotation sensor 1014A.

Advantageously, the source light signal 1003A emitted by the light source 1003 has a wide spectrum, i.e. this light source 1003 has a low time coherence. That way, the optically coherent spurious effects, such as the coherent backscattering or the cross-polarisation coupling in the optical fibres, liable to disturb the interferometric measurement device 1000 according to the prior art are avoided. The non-linear KERR effect is hence also suppressed.

Generally, the performances of the interferometric measurement device 1000 according to the prior art, in particular its sensitivity and its signal-to-noise ratio, are all the more better than the length of the coil-rotation sensor 1014A is great.

However, the increase of the length of the coil-sensor 1014A makes the interferometric measurement device 1000 not only more expensive, but also more sensitive to the thermal variations by SHUPE effect.

Hence, it is necessary to reach a compromise on the length of the coil-rotation sensor 1014A of the SAGNAC interferometer.

Moreover, it is known from the same document (see for example paragraph 11.1 and FIG. 11.1, pages 159 to 161) a resonant fibre-optic gyrometer or "R-FOG" in which the measurement means comprise a transmission-mode fibre-optic ring resonator.

According to the prior art, and as shown in FIG. 2, such a ring resonator 40 includes a first gate 41 and a second gate 42.

As known, a light signal 41A incident on the first gate 41, then called input gate, travels through the ring resonator 40 that then transmits a transmitted light signal 42A on the second gate 42, then called transmitted output gate.

As shown in FIG. 2, such a transmission-mode fibre-optic ring resonator 40 has generally a response curve $T_L(f)$, in frequency (in Hertz), at its transmitted output gate 42 with transmission resonance peaks 43.

This conventional response of the ring resonator 40, which corresponds to the ratio between the power of the transmitted light signal 42A and the power of the incident light signal 41A, may be characterized by the giving:

- of the free spectral range ISL corresponding to the distance, in frequency, between two successive resonance peaks 43, and
- of the finesse F corresponding to the ratio between the free spectral range ISL of the ring resonator 40 and of the full width at half maximum, in frequency, noted FWHM$_R$(f), of the resonance peaks 43 of the response curve $T_L(f)$: the latter are hence all the more fine that the finesse F of the ring resonator 40 is great (at a given free spectral range ISL).

Theoretically, a R-FOG using a ring resonator of total length $L_R$ and of finesse F could reach the same performances as an I-FOG having a fibre-optic coil-rotation sensor of F/2 times greater length, i.e. $F*L_R/2$.

Indeed, the SHUPE effect in a R-FOG using a ring resonator is reduced with respect to an I-FOG due to the fact that it uses a shorter fibre-optic coil (see for example Wang et al., "Resonator Fiber-Optic Gyro with Bipolar Digital Serrodyne Modulation Scheme", in OFS 2012, 22nd *International Conference on Optical Fiber Sensors*, Beijing, Proceedings of SPIE, Vol. 8421, 2012).

However, to have an interest, the R-FOG using a ring resonator 40 according to the prior art cannot use a wide-spectrum light source. The ring resonator 40 according to the prior art must necessarily be used in combination with a narrow-spectrum light source.

It will be considered herein that a light source is narrow-spectrum when the full width at half maximum FWHM$_S$, in wavelength (for example in nanometers or nm) or in frequency (for example in terahertz or THz), of this light source spectrum is such that: $FWHM_S<ISL/(10*F)$, the free spectral range ISL being then expressed in wavelength or in frequency.

In other words, a light source will be narrow-spectrum is the full width at half maximum $FWHM_S$ of this light source is at most ten times smaller than the full width at half maximum $FWHM_R$ of the resonance peaks of the ring resonator 40, i.e. if $FWHM_S<FWHM_R/10$.

Such a narrow-spectrum light source has by principle a great time coherence, characterized by a coherence length $L_{coh}$.

This coherence length $L_{coh}$, for the narrow-spectrum light source used in combination with a ring resonator of total length $L_R$ and of finesse F is, preferably, higher than ten times the product of the total length $L_R$ by the finesse F, i.e.: $L_{coh}>10*F*L_R$.

In practice, the use of a light source of great time coherence does not allow to reach very high performances due to coherent spurious effects such as the Rayleigh backscattering and the cross-polarisation coupling, as well as due to the non-linear Kerr effect.

In particular, a resonant gyrometer using such a light source has a long-term drift that hampers the accuracy of the measurements over long durations.

In order to remedy the above-mentioned drawbacks of the state of the art, the present invention proposes an interferometric measurement device allowing to use a wide-spectrum light source and fibre-optic measurement means of moderate length in this interferometric measurement device so as to free from the coherent effects of the light source and to reduce the Shupe effect to reach very high performances.

More precisely, the invention relates to a fibre-optic interferometric measurement device intended to measure a physical parameter and including:

- a wide-spectrum light source emitting a source light signal,
- a fibre-optic Sagnac interferometer, in which propagate a first light wave and a second light wave, which are counter-propagating, said Sagnac interferometer comprising:
  - an input port receiving, in a forward direction, an input light signal,
  - a splitter connected, on the one hand, to said input port and, on the other hand, to a first arm and to a second arm of said Sagnac interferometer,
  - measurement means sensitive to said physical parameter to be measured, said physical parameter generating a non-reciprocal phase difference $\Delta\phi_p$, which is function of said physical parameter, between said two counter-propagating light waves, and
  - an output port, common with said input port, transmitting, in a return direction opposite to the forward direction, an output light signal having an output light power that is function of the total phase difference $\Delta\phi_t$ between said two counter-propagating light waves and of the physical parameter to be measured,
- an optical radiation detector, receiving said output light power exiting from said Sagnac interferometer and delivering an electric signal representative of the output light power, and
- a source coupler that couples, in said forward direction, said light source to said input port of the Sagnac interferometer, and in said return direction, to said output port of the Sagnac interferometer to said detector.

According to the invention, said measurement means of the Sagnac interferometer include a transmission-mode fibre-optic ring resonator, said ring resonator comprising a first coupler, respectively a second coupler, which couples the first arm, respectively the second arm, of said Sagnac interferometer to said ring resonator, so that said first and second light waves in said ring resonator circulate in opposite directions of propagation.

Hence, thanks to the use of said fibre-optic ring resonator in the measurement means, the interferometric measurement device according to the invention allows to achieve very high performances without being limited by the Shupe effect nor by the coherence effects.

In other words, the interferometric measurement device according to the invention has:

- performances substantially equivalent to those of an interferometric measurement device according to the prior art using a coil-rotation sensor of length $F*L_R/2$, where F and $L_R$ are the finesse and the total length, respectively, of the ring resonator used in the interferometric measurement device according to the invention, and
- a reduced Shupe effect substantially equivalent to that present in a R-FOG using a ring resonator of same length.

Besides, as the length of optical fibre used in the interferometric measurement device according to the invention is shorter (about F/2 times shorter), the cost of such a fibre-optic interferometric measurement device is lower.

Finally, despite the use of this ring resonator, it is nevertheless possible to use the wide-spectrum light source, which allows in particular to free from the spurious effects of a narrow-spectrum source, as the Rayleigh backscattering, the cross-polarisation couplings and the non-linear Kerr effect.

It will be considered herein that a light source is wide-spectrum by comparison of its optical properties with those of a ring resonator. More precisely, according to the invention, the light source is wide-spectrum when the full width at half maximum $FWHM_S$, in optical frequency, of this light source spectrum is higher than or equal to ten times the free spectral range ISL of the ring resonator, i.e. $FWHM_S\geq10*ISL$.

In practice, the spectrum of the light source has a very higher full width at half maximum $FWHM_S$, higher than one million times the free spectral range ISL of the ring resonator, i.e. $FWHM_S\geq10^6*ISL>>ISL$.

Moreover, other advantageous and non-limitative characteristics of the interferometric measurement device according to the invention are the following:

- said ring resonator comprises at least one first fibre-optic coil located on a first portion of the ring resonator, between said first coupler and said second coupler;
- said ring resonator comprises a second fibre-optic coil, of same length L as the first fibre-optic coil, located on a second portion of said ring resonator, said first and second fibre-optic coils being separated by said first coupler and said second coupler;
- said ring resonator comprises two additional portions of optical fibre, whose length sum is equal to 2*L', L' being the sum of the lengths of said first and second arms of the Sagnac interferometer determined between said splitter and said first and second couplers, respectively, said two additional portions being arranged on either side of said second fibre-optic coil, between said second coil and one of said first and second couplers;
- said interferometric measurement device includes a modulation chain adapted to modulate said output light power $P_{OUT}$ exiting from said Sagnac interferometer, said modulation chain comprising a phase modulator arranged at the splitter, on the first and the second arms of the SAGNAC interferometer, to introduce, between said forward direction and said return direction, a modulation phase shift $\phi_m$ on each of said first and second light waves propagating in said first and second arms;

said modulation phase shift $\phi_m$, has a biasing phase-shift component $\phi_b$, at a proper frequency $f_p(L)$, which is a function of the length L of said first fibre-optic coil;

said modulation phase shift $\phi_m$, has a biasing phase-shift component $\phi_b$, at a proper frequency $f_p(L+L')$, which is a function of the length L+L';

said modulation phase shift $\phi_m$, has a counter-reaction phase-shift component (I), which is a stair-step modulation of duration $\tau_g(L)$, function of the length L of said first fibre-optic coil. This duration $\tau_g(L)$ corresponds substantially to the time of propagation of the counter-propagating light waves in the SAGNAC interferometer after a passage in the first fibre-optic coil of the ring resonator.

The present invention finds a particularly advantageous application in the making of a fibre-optic gyrometer including an interferometric measurement device intended to measure the rotational speed about an axis of rotation perpendicular to the plane of the SAGNAC interferometer.

Hence, the present invention also relates to a gyrometer including an interferometric measurement device according to the invention, the physical parameter to be measured being a component of the rotational speed of said gyrometer about an axis of rotation, the variation of the non-reciprocal phase difference $\Delta\phi_p$ being produced by the physical parameter to be measured by SAGNAC effect.

The present invention moreover relates to an inertial attitude or navigation unit including at least one such gyrometer.

The present invention finally relates to an electric current or magnetic field sensor including an interferometric measurement device according to the invention, the variation of the phase difference being produced by the parameter to be measured by FARADAY effect.

The following description in relation with the appended drawings, given by way of non-limitative examples, will allow to understood in what consists the invention and how it may be implemented.

The associated explanations allow to understood the advantages of the various embodiments.

In the appended drawings.

As a preliminary, it will be noted that the identical or similar elements of the different embodiments of the invention will be, as far as possible, denoted by the same reference signs and will not be described every time.

Figure 3:
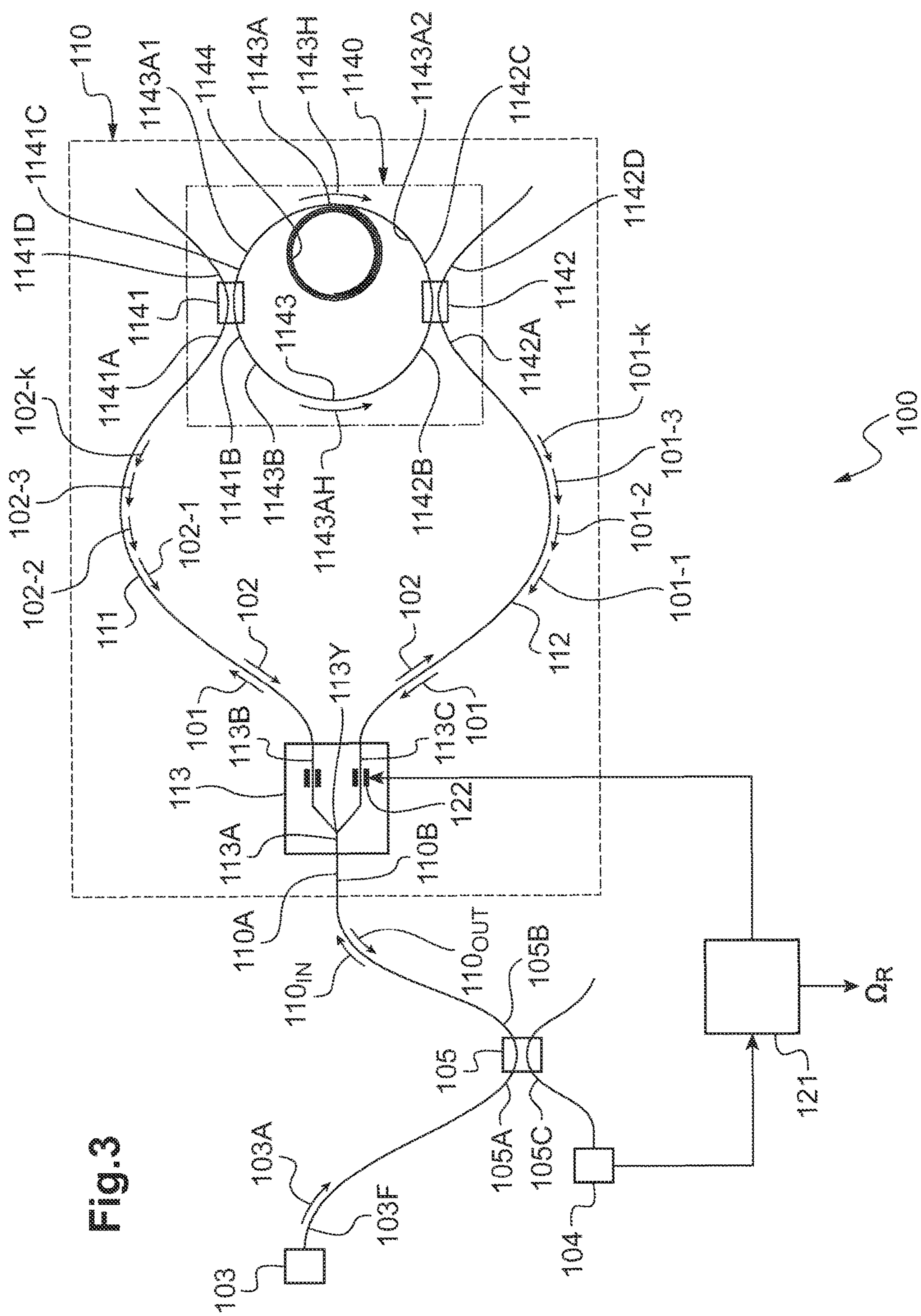
FIG. 3 shows a schematic view of an interferometric measurement device according to a first embodiment comprising a counter-propagating transmission-mode ring resonator.
Figure 10:
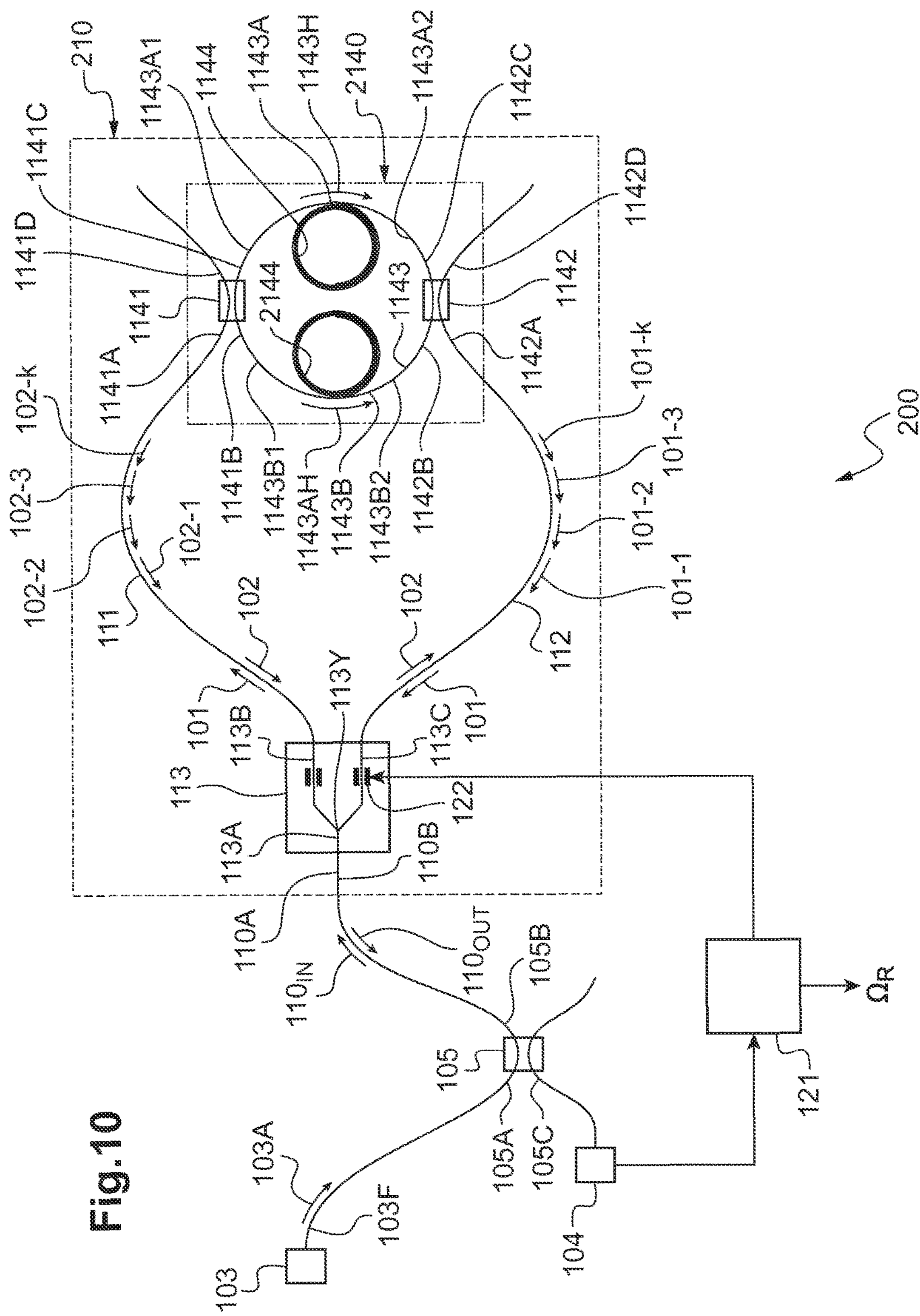
FIG. 10 is a schematic view of an interferometric measurement device according to a second embodiment comprising a counter-propagative transmission-mode ring resonator.
Figure 11:
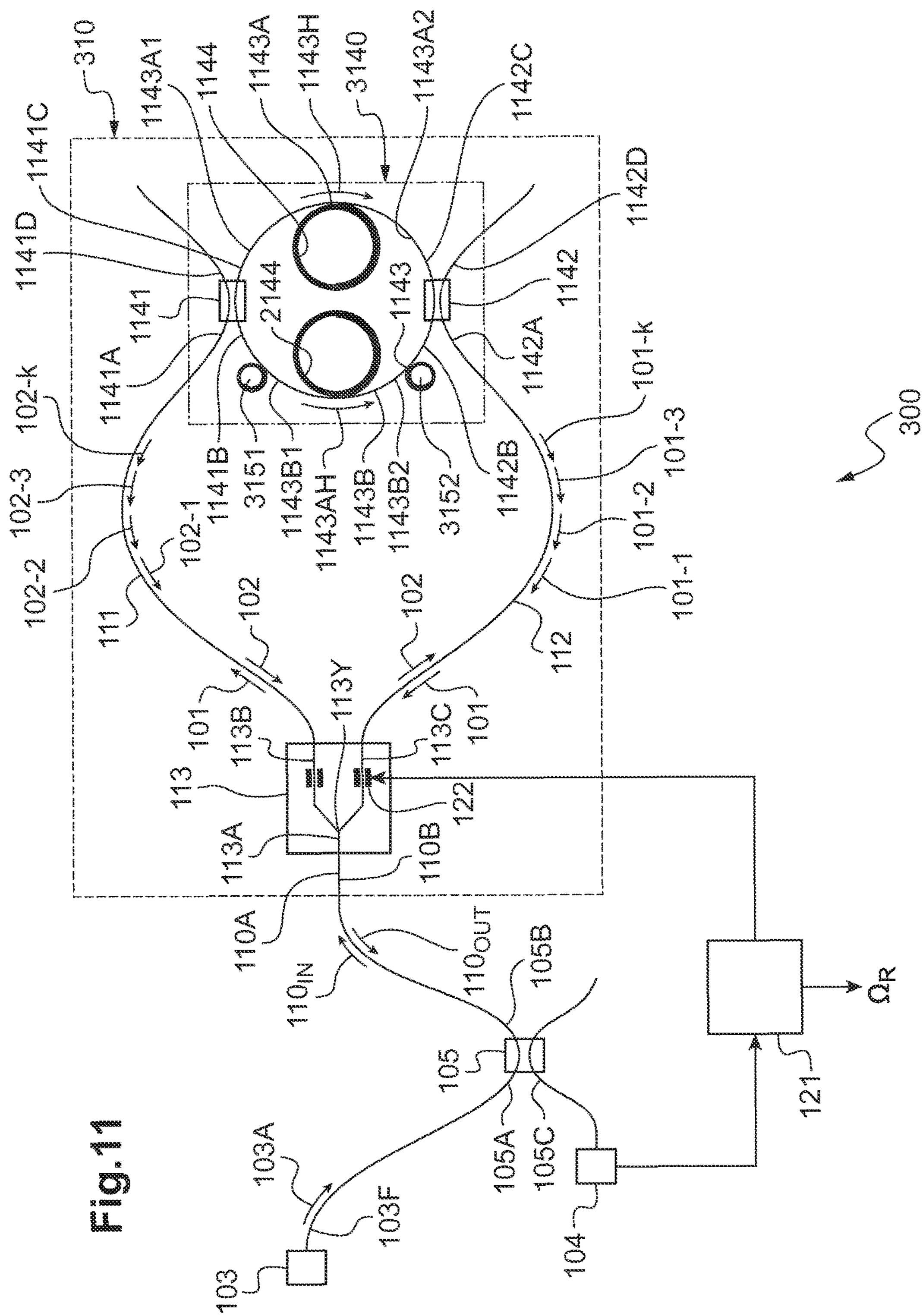
FIG. 11 is a schematic view of an interferometric measurement device according to a third embodiment comprising a counter-propagative transmission-mode ring resonator.

In FIGS. 3, 10 and 11 are shown three embodiments of a fibre-optic interferometric measurement device 100; 200; 300 intended to measure a physical parameter.

The interferometric measurement devices 100; 200; 300 described hereinafter each include a fibre-optic SAGNAC interferometer 110; 210; 310, in which propagate a first light wave 101 and a second light wave 102 that are counter-propagative, i.e. these two light waves 101, 102 circulate in opposite directions of propagation in the SAGNAC interferometer 110; 210; 310. The different elements of this SAGNAC interferometer 110; 210; 310 as well as its operation will be described in more details hereinafter.

With no limitation, it will be considered, in the following of the description, that the three particular embodiments of the interferometric measurement device 100; 200; 300 shown in FIGS. 3, 10 and 11 are part of an interferometric fibre-optic gyrometer (IFOG) in which the physical parameter to be measured is a component of the rotational speed of said gyrometer about an axis of rotation of the gyrometer. This component of the rotational speed will be noted $\Omega_R$.

The rotation of the interferometric fibre-optic gyrometer about its axis of rotation generates, between the first light wave 101 and the second light wave 102, a non-reciprocal phase difference $\Delta\phi_p$ that is produced by SAGNAC effect.

The interferometric measurement device 100; 200; 300 of the gyrometer then measures the component $\Omega_R$ of the rotational speed of the gyrometer based on the determination of this non-reciprocal phase difference $\Delta\phi_p$.

As a variant, the interferometric measurement device may be a part of a current or magnetic field sensor. In this case, the variation of the non-reciprocal phase difference $\Delta\phi_p$ between the two counter-propagating light waves propagating in the SAGNAC interferometer is then produced by the physical parameter to be measured by FARADAY effect.

As schematically shown in FIGS. 3, 10 and 11, the interferometric measurement device 100; 200; 300 first includes a light source 103.

The light source 103 is herein a wide-spectrum spontaneous emission light source. It is for example a fibre-optic ASE ("Amplified Spontaneous Emission") light source doped with a rare earth, for example erbium, as those used in the field of optical communication.

This wide-spectrum light source 103 emits a source light signal 103A, whose light spectrum $S(f_{opt})$ has been shown as a function of the optical frequency $f_{opt}$.

This source light signal 103A has a bell-shaped spectrum that:

is centred about a mean frequency $f_0$ such that $f_0$=193.5 THz (corresponding to a mean wavelength $\lambda_0$ of 1.55 microns) for which the power emitted by the light source 103 is maximum and equal to $S_0$, and at full width at half maximum $FWHM_S$, for half the light power $S_0/2$, such that $FWHM_S$=1 THz (corresponding to a full width at half maximum in source wavelength of about 8 nanometers).

It will be seen hereinafter in what it can be considered that this light spectrum is a wide spectrum according to the invention.

The source light signal 103A propagates, in a forward direction, along a source optical fibre 103F coupled to the output of the light source 103.

The source light signal 103A propagates up to a source port 105A of a fibre-optic source coupler 105.

As shown in FIGS. 3, 10 and 11, the interferometric measurement device 100; 200; 300 also includes a fibre-optic SAGNAC interferometer 110; 210; 310, the elements of which will be described in detail hereinafter.

The SAGNAC interferometer 110; 210; 310 first comprises an input port 110A receiving, in the forward direction, an input light signal $\mathbf{110}_{IN}$.

This input port 110A is connected to an interferometer port 105B of the source coupler 105.

So configured, the source coupler 105 couples, in the forward direction, the light source 103 to the SAGNAC interferometer 110; 210; 310 via its input port 110A.

In other words, the wide-spectrum source light signal 103A emitted by the light source 103 of the interferometric measurement device 100; 200; 300 is transmitted, in the forward direction, as the input light signal $\mathbf{110}_{IN}$ arriving at the input of the SAGNAC interferometer 110; 210; 310.

In the embodiments shown in FIGS. 3, 10 and 11, the source coupler 105 is a "2 by 2" ("2×2") fibre-optic coupler or an optical circulator.

As shown in FIGS. 3, 10 and 11, the SAGNAC interferometer 110; 210; 310 of the interferometric measurement device 100; 200; 300 also comprises a splitter 113 connected to the input port 110A of the SAGNAC interferometer 110; 210; 310.

This splitter 113 is herein an Y-junction coupler 113Y in integrated optics, including three coupling ports 113A, 1138, 113C, connected to the input port 110A, to a first arm 111 and to a second arm 112, respectively, of the SAGNAC interferometer 110; 210; 310 (see for example FIGS. 3, 10 and 11).

The first arm 111 and the second arm 112 of the SAGNAC interferometer 110; 210; 310 are herein each formed of a portion of optical fibre, which is preferably single-mode and polarisation-maintaining.

As a variant, the first arm and the second arm of the SAGNAC interferometer could for example be made by means of waveguides in integrated optics.

This splitter 113 divides, in the forward direction, the input light signal $\mathbf{110}_{IN}$ received via the input port 110A, on one side in the first arm 111 and on the other side in the second arm 112.

After separation at the junction 113Y of the splitter 113, the input light signal $\mathbf{110}_{IN}$ gives rise to the first light wave 101 and to the second light wave 102 that propagate in an input direction in the first arm 111 and the second arm 112, respectively, of the SAGNAC interferometer 110; 210; 310.

Advantageously, the splitter 113 is herein a so-called "50/50" equilibrated splitter, i.e. the respective amplitudes (in module) of the first and second light waves 101, 102, at the output of the splitter 113, are equal.

After propagation in the input direction along the first and second arms 111, 112, the first and second light waves 101, 102 reach measurement means 1140; 2140; 3140 of the SAGNAC interferometer 110, 210, 310 (see FIGS. 3, 10 and 11).

In the different embodiments shown in FIGS. 3, 10 and 11, the measurement means 1140; 2140; 3140 of the interferometric measurement device 100; 200; 300 include a fibre-optic ring resonator 1143.

Although the ring resonator 1143 is herein circular, any other ring geometry is possible. The diameter of the ring resonator 1143 will be noted $D_R$.

This ring resonator 1143 comprises a first and a second fibre-optic couplers 1141 and 1142.

The first coupler 1141 and the second coupler 1142 are herein analogous to the source coupler 105, i.e. these are four-port 2×2 couplers 1141A, 1141B, 1141C; 1141D, 1142A, 1142B, 1142C, 1142D.

The respective fourth ports 1141D and 1142D of the first and second couplers 1141, 1142 are made inoperative and the light signals exiting by these ports 1141D and 1142D are absorbed and not reflected.

Generally, the first coupler 1141 and the second coupler 1142 can be placed at any place along the ring of the ring resonator 1143.

With no limitation, the first and second couplers 1141, 1142 have been shown herein (see FIGS. 3, 10 and 11) at diametrically opposed positions along the circular ring of the ring resonator 1143.

So-arranged, the first coupler 1141 and the second coupler 1142 delimit a first portion 1143A and a second portion 1143B of the ring resonator (see FIGS. 3, 10 and 11), which each extend between this first coupler 1141 and this second coupler 1142.

Hereinafter, the lengths of the first and second portions 1143A, 1143B determined along the first and second portions 1143A, 1143B, between the first coupler 1141 and the second coupler 1142, respectively, will be noted $L_A$ and $L_B$.

Likewise, the total length of the ring resonator 1143, which is hence equal to the sum of the length $L_A$ of the first portion 1143A and of the length $L_B$ of the second portion 1143B, will be noted $L_R$, i.e. $L_R=L_A+L_B$.

Finally, it will be noted:

$L'_A$ and $L'_B$ the respective lengths of the first and second arms 111, 112 of the SAGNAC interferometer 110; 210; 310, determined between the splitter 113, and the first and second couplers 1141, 1142, respectively, and L' the total length of the arms 111, 112 of the SAGNAC interferometer 110; 210; 310, this total length L' being equal to the sum of the respective lengths $L'_A$, $L'_B$ of these two arms 111, 112, i.e. $L'=L'_A+L'_B$.

In the embodiments represented in FIGS. 3, 10 and 11, the first and second arms 111, 112 of the SAGNAC interferometer 110; 210; 310 are of same length, so that $L'_A=L'_B=L'/2$, for the sake of symmetry.

As a variant, the first arm 111 and the second arm 112 of the SAGNAC interferometer 110; 210; 310 could be of different lengths ($L_A \neq L_B$), for example to minimize the coherence of the cross-polarisation coupling effects.

The first coupler 1141, respectively the second coupler 1142, couples the first arm 111, respectively the second arm 112, of the SAGNAC interferometer 110; 210; 310 to the ring resonator 1143.

More precisely, the first arm 111, respectively the second arm 112, of the SAGNAC interferometer 110; 210; 310 is connected to the first port 1141A of the first coupler 1141, respectively to the first port 1142A of the second coupler 1142.

The travel of the first light wave 101 through the ring resonator 1143 of the SAGNAC interferometer 110; 210; 310 will be described hereinafter, it being understood that, given the configuration of the SAGNAC interferometer 110; 210; 310 in the different embodiments (see FIGS. 3, 10 and 11), the second light wave 102 travels along an opposite path, i.e. performs in the SAGNAC interferometer 110; 210; 310 a travel in the opposite direction relative to the first light wave 101.

The first light wave 101, which comes from the splitter 113 of the SAGNAC interferometer 110; 210; 310, propagates in the input direction on the first arm 111, then is incident on the first port 1141A of the first coupler 1141. The first light wave 101 is then coupled in the ring resonator 1143 via the third port 1141C of the first coupler 1141.

Hence, the first light wave 101 circulates in the ring resonator 1143 in a clockwise direction of circulation 1143H (see the arrow 1143H in FIGS. 3, 10 and 11 that show this propagation direction).

Oppositely, the second light wave 102 circulates in the ring resonator 1143 in an anti-clockwise direction of circulation 1143AH (see also FIGS. 3, 10 and 11). That way, the first and second light waves 101, 102 in the ring resonator 1143 circulate in opposite directions of propagation.

After coupling, the first light wave 101 propagates, in the clockwise direction of propagation 1143H, along the first portion 1143A of the ring resonator 1143, from the first coupler 1141 to the second coupler 1142, more precisely between the third port 1141C of the first coupler 1141 and the third port 1142C of the second coupler 1142.

After having travelled through this first portion 1143A of the ring of the ring resonator 1143 in the clockwise direction of circulation 1143H—this will be referred to hereinafter by the first passage in the ring resonator 1143—the first light wave 101 is:

on the one hand, coupled to the second arm 112 of the SAGNAC interferometer 110; 210; 310 via the first port 1142A of the second coupler 1142, to propagate along this second arm 112 in the output direction, and on the other hand, transmitted in the second portion 1143B of the ring of the ring resonator 1143 via the second port 1142B of the second coupler 1142, to propagate still in the clockwise direction of circulation 1143H.

Hence, after its first passage in the ring resonator 1143, the first light wave 101 will have travelled through the first portion 1143A of the ring resonator 1143 along a length $L_A$ of the optical fibre. It is the same for the second light wave 102, except that at the first passage the latter travels through the first portion 1143A of the ring resonator 1143 in the anti-clockwise direction of circulation 1143H.

After this first passage, the coupling of the first light wave 101 thanks to the second coupler 1142 hence gives rise to a first light wave 101-1 transmitted by the ring resonator 1143, this first transmitted light wave 101-1 propagating in the second arm 112 of the SAGNAC interferometer 110; 210; 310.

After transmission in the second portion 1143B of the ring of the ring resonator 1143, the first light wave 101 is again incident on the first coupler 1141, at the second port 1141B thereof, the first coupler 1141 transmitting, from the second port 141B to the third port 1141C, a part of the first light wave 101 towards the first portion 1143A of the ring of the ring resonator 1143, the other part being coupled towards the fourth port 1141D to be absorbed.

The first light wave 101 circulates again along the first portion 1143A of the ring resonator 1143 in the clockwise direction of circulation 1143H and hence performs a second passage in the ring resonator 1143, before being coupled to the second arm 112 of the SAGNAC interferometer 110; 210; 310 to give rise to a second transmitted light wave 101-2 after the second passage in the ring resonator 1143.

Hence, after the second passage, the first light wave 101 will have travelled through the ring resonator 1143 along the length of the first passage, i.e. $L_A$, plus the total length $L_R$ of the ring resonator 1143, i.e. $L_R=L_A+L_B$, i.e. a total length of optical fibre travelled through at the second passage equal to $L_A+(L_A+L_B)$.

It is then understood that the first light wave 101, and hence also the second light wave 102, circulate a very high number of times in the ring resonator 1143 of the SAGNAC interferometer 110; 210; 310 as it is the case for any resonator or cavity in physical optics.

In other words, the first and second counter-propagating light waves 101, 102 perform multiple passages in the ring resonator 1143 of the measurement means 1140; 2140; 3140 of the SAGNAC interferometer 110; 210; 310, the first light wave 101 in the clockwise direction of circulation 1143H and the second light wave 102 in the anti-clockwise direction of circulation 1143AH.

At each passage in the ring resonator 1143, the first light wave 101 and the second light wave 102 each give rise to a transmitted light wave.

In the following of the description, the light waves transmitted by the ring resonator 1143 after the k-th passage of the first light wave 101, respectively of the second light wave 102, will be denoted by signs 101-*k* and 102-*k* (k being a non-zero natural integer, i.e. k=1, 2, 3, etc. . . . ), respectively.

The first light wave 101 propagates in the output direction in the second arm 112 of the SAGNAC interferometer 110; 210; 310, and hence the superimposition, within the meaning of the interferential sum, of the first transmitted light wave 101-1 at the first passage, of the second transmitted light wave 101-2 at the second passage, of the third transmitted light wave 101-3 at the third passage, etc. . . . .

Likewise, the second light wave 102 propagating in the output direction in the first arm 111 of the SAGNAC interferometer 110; 210; 310 is the superimposition of the first transmitted light wave 102-1 at the first passage, of the second transmitted light wave 102-2 at the second passage, of the third transmitted light wave 102-3 at the third passage, etc. . . . .

As described hereinabove, the first passage corresponds to the travel, in opposite directions, of the light waves 101, 102 along the first portion 1143A of the ring resonator 1143. At the second passage, the light waves 101, 102 travel, in addition to the first passage, once along the second portion 1143B and again once more along the first portion 1143A of the ring resonator 1143. Hence, at the second passage, the light waves 101, 102 travel, in addition to the first passage, once along the totality of the ring resonator 1143.

By iteration, it is understood that at the third passage the light waves 101, 102 travel, in addition to the first passage, along twice the totality of the ring resonator 1143, and so on, for the following passages.

Hereinafter, the total length of the optical fibre travelled through at the k-th passage by the first and second light waves 101, 102 in the SAGNAC interferometer 110; 210; 310 will be noted $L_k$, this total length $L_k$ travelled through at the k-th passage being determined from the splitter 113 of the SAGNAC interferometer 110; 210; 310 after the passage in the ring resonator 1143.

Based on the previous explanations, it is hence understood that the total length $L_k$ travelled through at the k-th passage may be expressed, as a function of the length $L_A$ of the first portion 1143A of the ring resonator 1143, of the total length $L_R$ of ring resonator 1143 and of the total length L' of the arms 111, 112 of the SAGNAC interferometer 110; 210; 310 by the following relation: $L_k=L_A+(k-1)*L_R+L'$ (or also $L_k=k*L_A (k-1)*L_B+L'$).

Hence, the total length $L_1$ travelled through after the first passage is hence equal to $L_A+L'$; the total length $L_2$ travelled through after the second passage is equal to $L_A+L_R+L'$, or also $L_2=2*L_A+L_B+L'=L_R$; the total length $L_3$ travelled through after the third passage is equal to $L_A+2*L_R+L'$, or also $L_3=3*L_A+2*L_B+L'=L_2+L_R=L_1+2*L_R$, etc. . . . .

The configurations of the ring resonator 1143 shown in FIGS. 3, 10 and 11 correspond to known configurations of the transmission-mode ring resonator 1143 (by opposition to other configurations of reflection-mode ring resonator).

In order to evaluate the amplitudes and the optical powers of the different light waves circulating in the ring resonator 1143, it is conventional to introduce the respective power coupling coefficients C1, C2 and the respective power transmission coefficients T1, T2 in the first and second couplers 1141, 1142.

With no limitation, it will be considered in the following of the description that, in the three embodiments shown in FIGS. 3, 10 and 11, the first and second couplers 1141, 1142 are identical, so that they have the same coupling coefficient C (C=C1=C2) and the same transmission coefficient T (T=T1=T2).

As a variant, the first coupler and the second coupler could for example be different and hence have different characteristics of coupling ($C1\neq C2$) and of transmission ($T1\neq T2$).

It will be seen in the following of the description that, advantageously, the coupling coefficient C of the first and second couplers 1141, 1142 of the ring resonator 1143 is low, preferably comprised between 5% and 30%.

Preferably, the first and second fibre-optic couplers 1141, 1142 have low losses, so that it is possible to consider that the coupling coefficient C and the transmission coefficient T are linked by the following relation: C+T=100%.

Hence, advantageously, the transmission coefficient T of the first and second couplers 1141, 1142 of the ring resonator 1143 is high, preferably comprised between 95% and 70%.

With no limitation, it will be considered in the following of the description that the power coupling coefficient C and the power transmission coefficient T of the first and second couplers 1141, 1142 are herein equal to 10% and 90%, respectively.

As described hereinabove, after circulation in the ring resonator 1143 and coupling by means of the first and second couplers 1141, 1142, the first and second light waves 101, 102 propagate, in the output direction, along the second arm 112 and along the first arm 111, respectively, of the SAGNAC interferometer 110; 210; 310 (see FIGS. 3, 10 and 11).

These two light waves 101, 102 are then recombined by the splitter 113 travelled through in the return direction.

An output light signal $\mathbf{110}_{OUT}$, having an output light power $P_{OUT}$, is then delivered by the splitter 113 towards an output port 1108 of the SAGNAC interferometer 110; 210; 310, this output port 1108 being common with the input port 110A.

This output port 1108 transmits, in the return direction opposite to the forward direction, the output light signal $\mathbf{110}_{OUT}$ towards the interferometer port 105B of the source coupler 105.

At the output of the SAGNAC interferometer 110; 210; 310, the output light power $P_{OUT}$ of the output light signal $\mathbf{110}_{OUT}$, which results from the interferential recombination of the first light wave 101 and of the second light wave 102, is function of the total phase difference $\Delta\phi_t$ between these two counter-propagative light waves 101, 102.

This total phase difference $\Delta\phi_t$ includes information relating to the non-reciprocal phase difference $\Delta\phi_p$ generated by the variation of the physical parameter $\Omega_R$ to be measured.

It will be seen in the following of the description that the total phase difference $\Delta\phi_t$ can moreover be modulated so as to facilitate the processing of the output light signal $\mathbf{110}_{OUT}$.

As shown in FIGS. 3, 10 and 11, the source coupler 105 couples, in the return direction, the output light signal $\mathbf{110}_{OUT}$ incident on the interferometer port 105B to an optical radiation detector 104 connected to a detector port 105C of the source coupler 105.

Hence, the source coupler 105 couples, in the return direction, the output port 1108 of the SAGNAC interferometer 110; 210; 310 to the detector 104.

The optical radiation detector 104, receiving the output light power $P_{OUT}(\Delta\phi_t)$ exiting from the SAGNAC interferometer 110; 210; 310, then delivers an electric signal that is representative of the output light power $P_{OUT}(\Delta\phi_t)$.

For that purpose, in the three embodiments shown in FIGS. 3, 10 and 11, the interferometric measurement device 100; 200; 300 includes a modulation chain for modulating the output light power $P_{OUT}(\Delta\phi_t)$ exiting from the SAGNAC interferometer 110; 210; 310.

The modulation chain comprises a phase modulator 122 arranged at the splitter 113, in the first and second arms 111, 112 of the SAGNAC interferometer 110; 210; 310.

Advantageously, the phase modulator 122, which is placed in the SAGNAC interferometer 110; 210; 310, herein comprises a pair of elementary phase modulators mounted in "push-pull" configuration, placed at each of the ends of the arms 111, 112 of the SAGNAC interferometer 110; 210; 310, respectively.

The elementary phase modulators are herein of the electro-optical type, called POCKELS effect, in proton-exchange lithium niobate ($LiNbO_3$) integrated optics.

Thanks to the phase modulator 122, the modulation chain introduces a modulation phase shift on each of the first and second light waves 101, 102 propagating in the first and second arms 111, 112 of the SAGNAC interferometer 110; 210; 310.

It will be seen in the following of the description, with reference to the different embodiments shown in FIGS. 3, 10 and 11, that different modulation options exist, allowing to apply the suitable modulation phase shift $\phi_m$ to obtain the best sensitivity or the best signal-to-noise ratio.

The modulation chain further comprises a processing and control unit 121 that receives the electric signal delivered by the detector 104. In response to this electric signal, the processing and control unit 121, on the one hand, delivers, after digital treatment of the electric signal, a measurement of the physical parameter $\Omega_R$ to be measured, and on the other hand, controls the phase modulator 122 so as to optimally modulate the output light power $P_{OUT}$.

The different embodiments of the invention, shown in FIGS. 3, 10 and 11, will now be described in more details.

In a first embodiment, and as well shown in FIG. 3, the interferometric measurement device 100 is such that the ring resonator 1143 of the SAGNAC interferometer 110 comprises a first coil 1144 that is located on the first portion 1143A of the ring of the ring resonator 1143, between the first coupler 1141 and the second coupler 1142.

This first coil 1144 is a coil of optical fibre, preferably single-mode and polarisation-maintaining, that extends over a fibre length L.

The optical fibre used herein for the first coil 1144 is herein identical to those used for the arms 111, 112 and the ring resonator 1143 of the SAGNAC interferometer 110.

Preferably, the first fibre-optic coil 1144 has a symmetrical winding, for example a dipolar, quadrupolar or octopolar winding.

In the configuration of FIG. 3, the first light wave 101 and the second light wave 102 propagating in a counter-propagating way in the ring of the ring resonator 1143, and hence also in the first coil 1144.

Moreover, the addition of this first coil 1144 does not modify the direction of propagation of the different light waves 101, 102 circulating in the ring resonator 1143 during their different passages.

Nevertheless, the first fibre-optic coil 1144 lengthen the optical paths travelled through by these two light waves 101, 102.

More precisely, the first coil 1144, which is located in the first portion 1143A of the ring resonator 1143, modifies the length $L_A$ of this first portion 1143A, which is hence function of the length L of the first coil 1144.

In practice, the length L of the first coil 1144 is very longer, for example one hundred times greater, than the remaining portions 1143A1, 1143A2 of the optical fibre (see FIG. 3) of the ring resonator 1143 that are located in the first portion 1143A of the ring resonator 1143, between the first coupler 1141 and the first coil 1144 and between the second coupler 1142 and the first coil 1144, respectively.

Hence, generally, the length $L_A$ of the first portion 1143A of the ring resonator 1143 is very little different (slightly higher than) the length L of the first fibre-optic coil 1144 located on this first portion 1143A, i.e. $L_A \approx L$.

Moreover, in this first embodiment, the length L of the first fibre-optic coil 1144 is in practice very higher than the length $L_B$ of the second portion 1143B of the ring resonator 1143 ($L_B << L$), so that the total length $L_R = L_A + L_B$ of the resonator may be likened, in this first embodiment, to the length L of the first fibre-optic coil 1144, i.e. $L_R = L_A + L_B \approx L$.

Likewise, the length L of the first fibre-optic coil 1144 is in practice longer than the total length L' of the first and second arms 111, 112 of the SAGNAC interferometer 110 ($L' << L$), so that, in first approximation, the total length $L_1$ travelled through at the first passage may be likened, in this first embodiment, to the length L of the first fibre-optic coil 1144. Indeed, as seen hereinabove, the following relations are true: $L_1 = L_A + L' \approx L + L'$ because $L_A \approx L$, hence $L_1 \approx L$ because $L' << L$.

Figure 1:
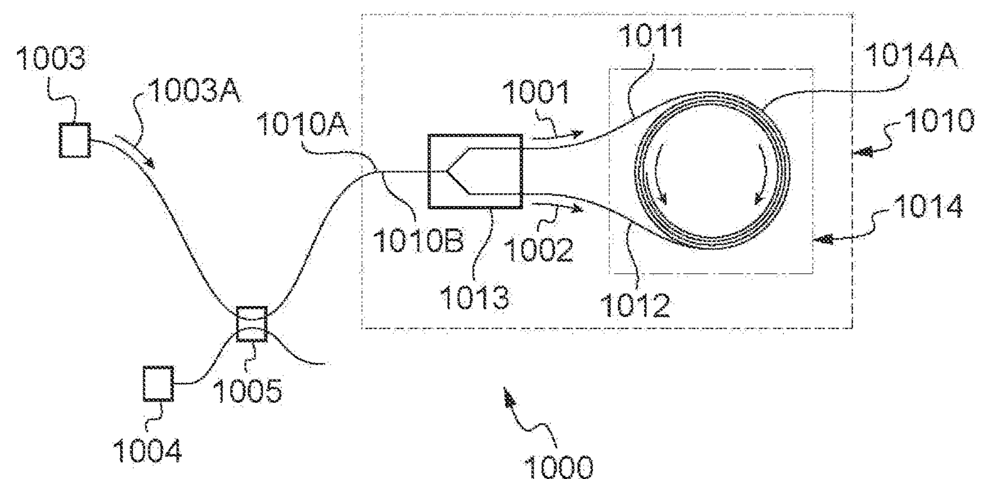
FIG. 1 shows a schematic view of an interferometric measurement device according to the prior art including a coil-rotation sensor.
Figure 2:
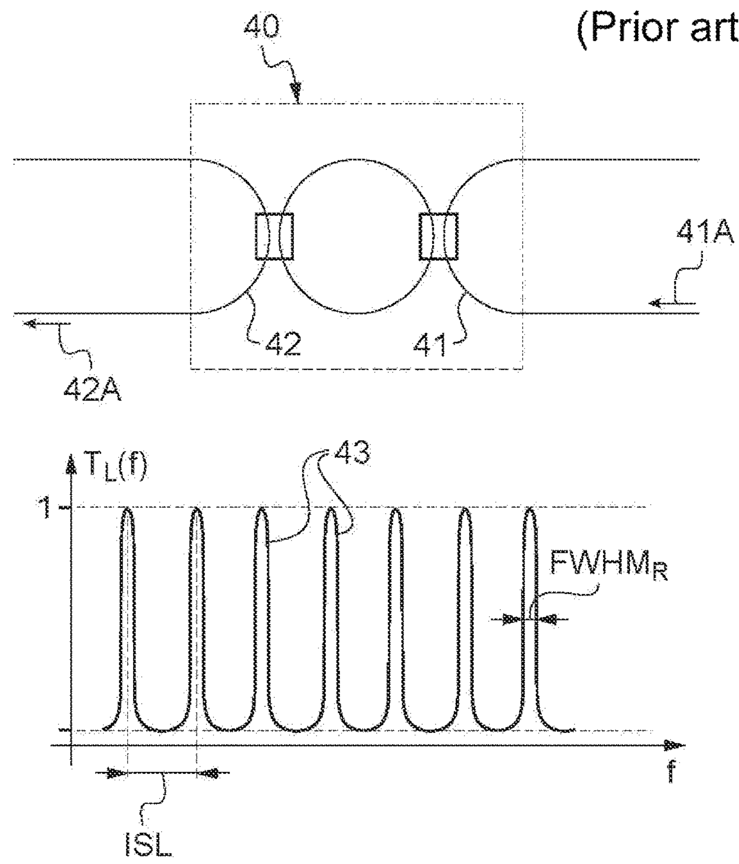
FIG. 2 is a schematic view of a transmission-mode fibre-optic ring resonator according to the prior art and of its light transmission curve, in frequency, on its transmitted output gate.

So constituted, the ring resonator 1143 has a transmission curve, in optical frequency, similar to that shown in FIG. 2. In particular, this transmission curve $T_L(f)$ has a series of resonance peaks 43 regularly spaced apart by a distance, in frequency, equal to the free spectral range ISL of the ring resonator 1143.

As known, the free spectral range ISL, in frequency, of the ring resonator 1143 is the inverse of the time of circulation in the ring resonator 1143. It is hence linked to the total length $L_R$ of the ring resonator 1143 by the following relation: $ISL = c/(n_{opt} * L_R)$, where c and $n_{opt}$ are the speed of light in vacuum (c=299792458 m/s) and the optical index of the optical fibre used in the ring resonator 1143 ($n_{opt} \approx 1.5$ for a conventional optical fibre made of silica), respectively.

The resonance peaks 43 have a full width at half maximum $FWHM_R(f)$, in frequency, equal to the quotient between the free spectral range ISL, expressed in frequency, and the finesse F of the ring resonator 1143, i.e. $FWHM_R = ISL/F$.

In other words, the finesse F of the ring resonator 1143 is equal to the ratio $ISL/FWHM_R(f)$ between the free spectral range ISL and the full width at half maximum $FWHM_R(f)$ of the resonance peaks 43 of the ring resonator 1143.

The finesse F of the ring resonator 1143 is also linked to the equivalent number $N_p$ of passages made by the light waves 101, 102 in the ring resonator 1143 before being fully attenuated due to the intrinsic losses of the latter.

This means that, beyond the $N_p$-th passage, the contribution of the light waves (i.e. all the transmitted light waves 101-*k* and 102-*k* for $k > N_p$) transmitted by the ring resonator 1143 to the first and second light waves 101, 102 in their output direction is negligible.

As known, the transmission curve $T_L(f)$ is the known response function of a ring resonator 1143 comprising two identical couplers 1141, 1142 of coupling coefficient C and transmission coefficient T.

Moreover, it will be noted that, generally, this response function is the same:

- for the first light wave 101 propagating in the SAGNAC interferometer 110 and circulating in the ring resonator 1143 in the clockwise direction of circulation 1143H, and
- for the second light wave 102 propagating in the SAGNAC interferometer 110 and circulating in the ring resonator 1143 in the anti-clockwise direction of circulation 1143AH.

Hence, by analogy with a FABRY-PEROT cavity, the response curve $T_L(f)$ is written as: $T_L(f) = 1/[1 + m^2 \sin^2(\pi * f * n_{opt} * L_R/c)]$, where m is the AIRY factor associated with the ring resonator 1143, m being linked to the coupling coefficient C and to the transmission coefficient T of the first and second fibre-optic couplers 1141, 1142 by the relation $m^2 = 4*T/(1-T)^2 = 4*(1-C)/C^2$ (because C+T=1, see hereinabove).

Based on the formula given above, it is conventionally found for the ring resonator 1143 that:

- the response curve $T_L(f)$ depends on the total length $L_R$ of the ring resonator 1143 and hence, herein, of the length L of the first fibre-optic coil 1144 insofar as, in this first embodiment, $L_R$ is substantially equal to L ($L_R \approx L$),
- the free spectral range ISL, in frequency, is equal to $c/(n_{opt} * L_R) \approx c/(n_{opt} * L)$, and
- the finesse F is equal to $\pi m/2$, i.e. also $F = (\pi * T^{1/2})/(1-T) = (\pi * (1-C)^{112})/C$ ($\approx 3/C$ when the coupling coefficient C is lower than 30%). The finesse F hence increases with the transmission coefficient T of the first and second couplers 1141, 1142.

By way of example, the couplers having coupling coefficients C and transmission coefficients T such as those chosen previously (C=10% and T=90%), the following values are obtained: $m \approx 19$ ($m^2 = 360$) and $F \approx 30$ (=3/C).

The length L of the first coil 1144 being herein of 200 meters, the free spectral range ISL, in frequency, is hence equal to about 1 MHz ($n_{opt} \approx 1.5$).

Hence, as mentioned hereinabove, the light source 103 is a wide-spectrum source because the full width at half maximum $FWHM_S = 1$ THz, in optical frequency, of the light source 103 is higher than ten times the free spectral range ISL. Indeed, the ratio $FWHM_S/ISL$ is herein equal to 1 THz/1 MHz=$10^6$.

As can be seen in FIG. 2, the resonance peaks 43 of the response curve $T_L(f)$ have:

maximum values equal to the unit (100% of transmission)

minimum values of transmission that are not equal to zero but equal to $1/(1+m^2)$.

The maximum values of the transmission curve correspond to the case where the light waves having circulated once, twice, three times, etc. . . . in the ring resonator 1143 are transmitted in phase by the latter, said light waves then interfering constructively between each other.

On the contrary, the minimum values of the transmission curve correspond to the case where the light waves having circulated once, twice, three times, etc. . . . in the ring resonator 1143 are transmitted in phase opposition by the latter, said light waves then interfering destructively between each other.

The contrast of the resonance peaks, i.e. the ratio between the difference and the sum of the maximum and minimum values of the resonance peaks, is equal to $m^2/(m^2+2)$.

Hence, based on the above formulas, it is understood that the contrast increases if the transmission coefficient T of the couplers 1141, 1142 of the ring resonator 1143 increases.

Figure 4:
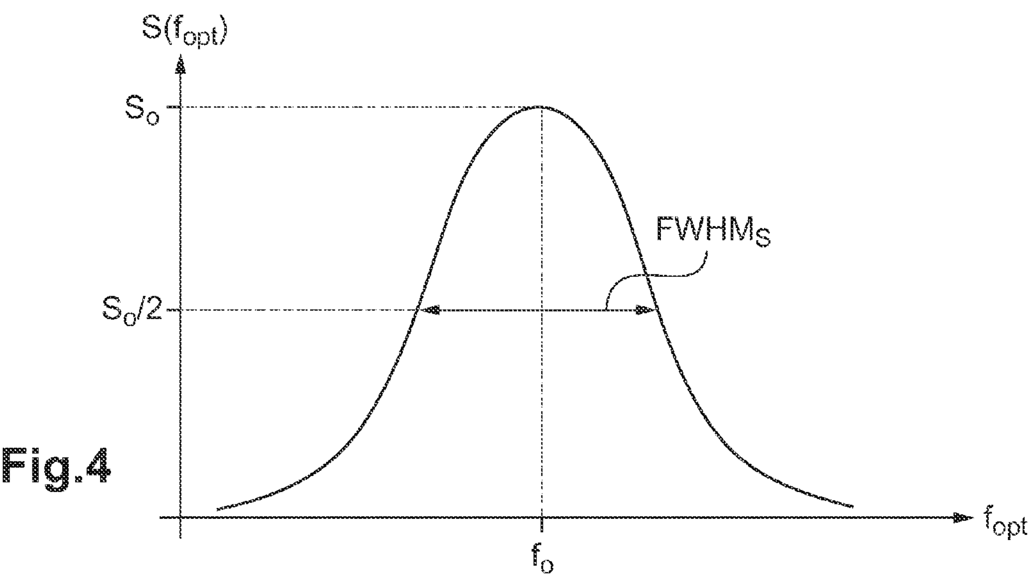
FIG. 4 is a curve showing, as a function of the optical frequency $f_{opt}$, the wide spectrum of the light source used in all the embodiments of the interferometric measurement device according to the invention.
Figure 5:
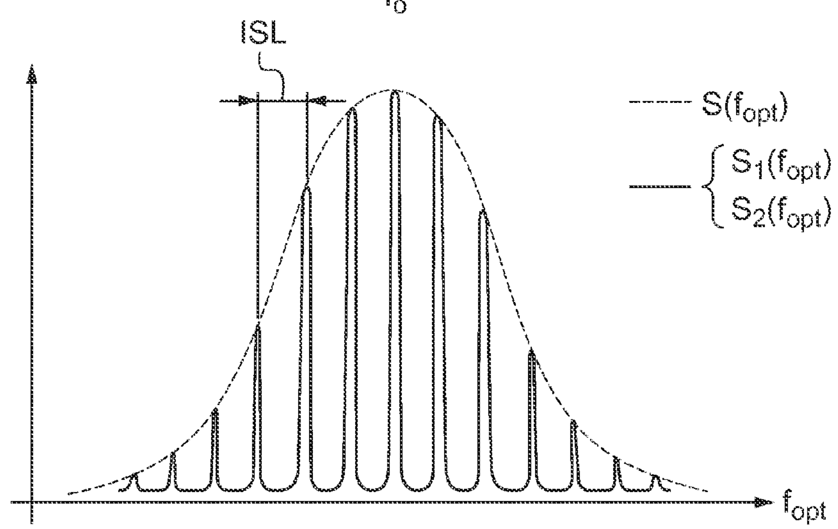
FIG. 5 is a curve showing the light spectrum, in optical frequency, of a light signal transmitted by the ring resonator of FIG. 3.

In FIG. 5 are shown the light spectra of the first and second light waves after transmission through the ring resonator 1143. These light spectra correspond to the product of the spectrum $S(f_{opt})$ of the light source 103 of FIG. 4 by the transmission curve $T_L(f)$ of FIG. 2.

Conventionally, the light spectrum of FIG. 5 is referred to as a "channelled" spectrum.

The behaviour of the interferometric measurement device 100 when the latter is at rest and in move will be detailed hereinafter.

It will be understood herein that the interferometric measurement device 100 shown in FIG. 3 is at rest when the component $\Omega_R$ of the rotational speed is zero, indicating that the SAGNAC interferometer 110 undergoes no non-reciprocal effect due to its rotation.

In contrast, it will be understood that the interferometric measurement device 100 is in move when the component $\Omega_R$ of the rotational speed is non-zero (positive or negative), indicating that the SAGNAC interferometer 110 undergoes a non-reciprocal effect due to the rotation thereof.

At rest, the two light spectra $S1(f_{opt})$, $S2(f_{opt})$ are identical and superimpose perfectly to each other: each resonance peak P1 (see FIG. 6) of the light spectrum $S1(f_{opt})$, corresponding to a particular optical frequency, which is integrally transmitted by the ring resonator 1143 of the SAGNAC interferometer 110 (the light waves having performed one, two, three, etc. . . . passages in the ring resonator 1143 interfering in phase at the output of the SAGNAC interferometer 110), interferes constructively with a resonance peak P2 (see also FIG. 6) of the light spectrum $S2(f_{opt})$, so that, at the output of the SAGNAC interferometer 110, the output light power $P_{OUT}$ is maximum and equal to $P_0$.

In move, the first light wave 101 and the second light wave 102, which are counter-propagating in the SAGNAC interferometer 110, and in particular in the ring resonator 1143, go out of the latter with a phase shift, the total phase difference $\Delta\phi_t$ between the two light waves 101, 102 varying in particular as a function of the non-reciprocal phase difference $\Delta\phi_p$ introduced between the two light waves 101, 102 by the variation of the parameter to be measured, herein the component $\Omega_R$ of the rotational speed.

Figure 7:
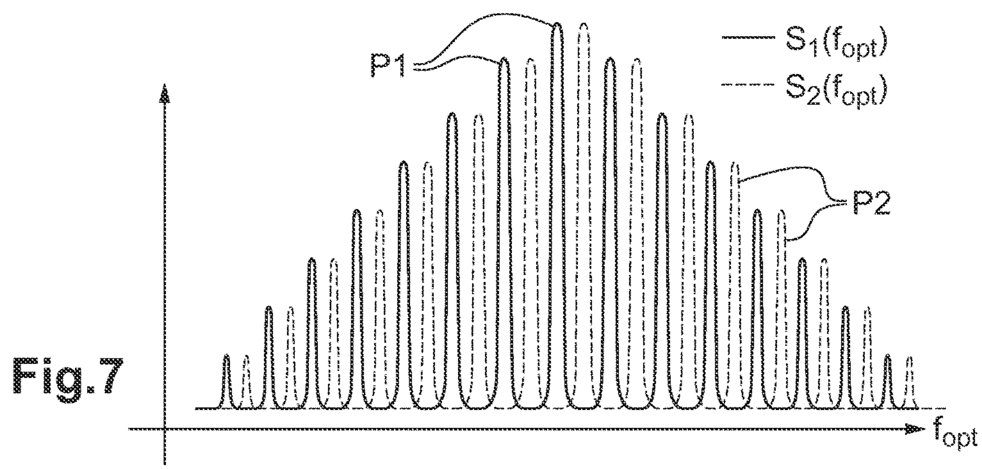
FIG. 7 shows the offset curves of the light spectra transmitted in opposite directions by the ring resonator of the interferometric measurement device of FIG. 3 in rotational movement.

This case is shown in FIG. 7, in which it has been shown on a same curve, as a function of the optical frequency $f_{opt}$, the light spectra $S1(f_{opt})$, $S2(f_{opt})$ of the first and second light waves 101, 102 at the output of the SAGNAC interferometer 110 when it is in move.

In move, the two light spectra S1 $(f_{opt})$, $S2(f_{opt})$ are almost identical, because the free spectral range ISL varies almost not during the rotation.

Nevertheless, the two light spectra $S1(f_{opt})$, $S2(f_{opt})$ are offset relative to each other due to the SAGNAC effect, the offset being function of the physical parameter $\Omega_R$ to be measured.

In the situation shown in FIG. 7, the resonance peaks P2 of the light spectrum $S2(f_{opt})$ of the second light wave 102 at the output of the SAGNAC interferometer 110 are located at equal distance from the two successive resonance peaks P1 of the light spectrum S1 $(f_{opt})$ of the first light wave 101 at the output of the SAGNAC interferometer 110. Hence, the channels P1, P2 of the first light wave 101 and those of the second light wave 102, which correspond to different optical frequencies, cannot interfere between each other and there is a loss of contrast, so that the output light power $P_{OUT}$ is equal to half the maximum power, i.e. $P_0/2$.

Figure 6:
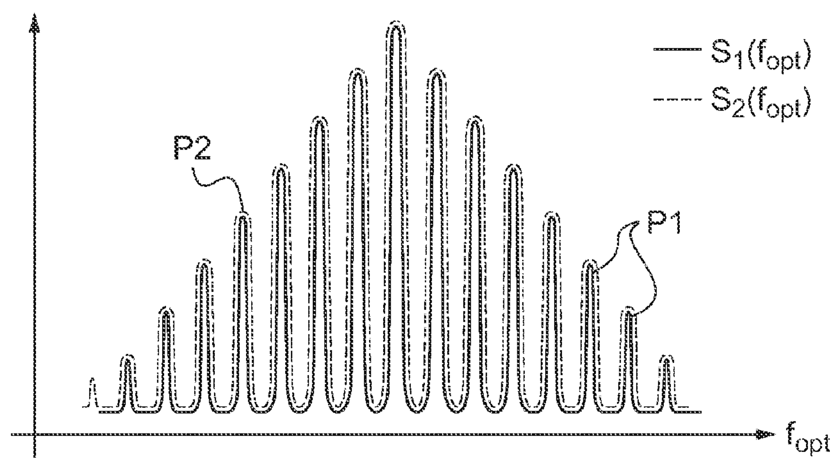
FIG. 6 shows the superimposed curves of the light spectra transmitted in opposite directions by the ring resonator of the interferometric measurement device of FIG. 3 at rest.
Figure 8:
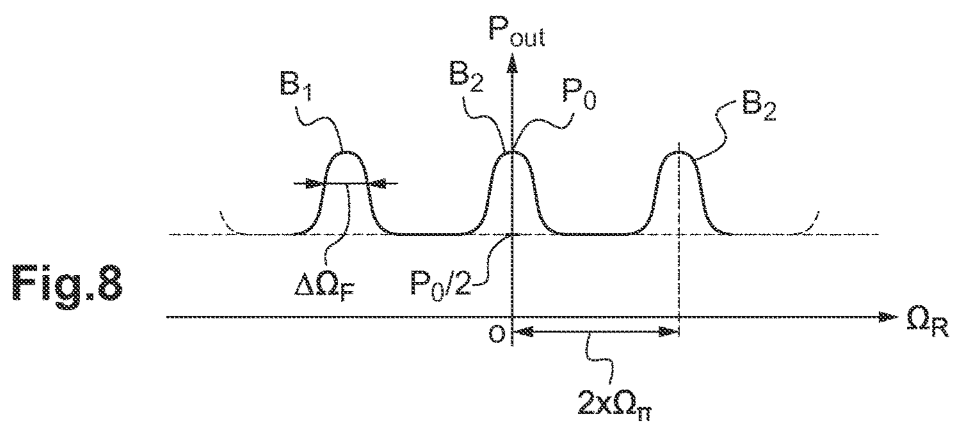
FIG. 8 is a curve showing the response, in light power, of the interferometric measurement device of FIG. 3 as a function of the physical parameter to be measured and in the absence of modulation.

Between the situation of FIG. 6 (rest) and that of FIG. 7 (move), the output light power $P_{OUT}$, function of the component $\Omega_R$ of the rotational speed, varies according to the curve shown in FIG. 8. The output light power $P_{OUT}$ is periodic, of period $2*\Omega_\Pi=\lambda_0*c/(2*L_R*D_R)$, the width of the bumps B1, B2, B3 (see FIG. 8) being equal to $\Delta\Omega_F=\Omega_\Pi/2F$.

Preferably, the modulation phase shift $\phi_m$, has a counter-reaction phase-shift component (I), intended to bring back about the zero step difference ($\Delta\phi_t=0$) the working point of the SAGNAC interferometer 110.

Figure 9:
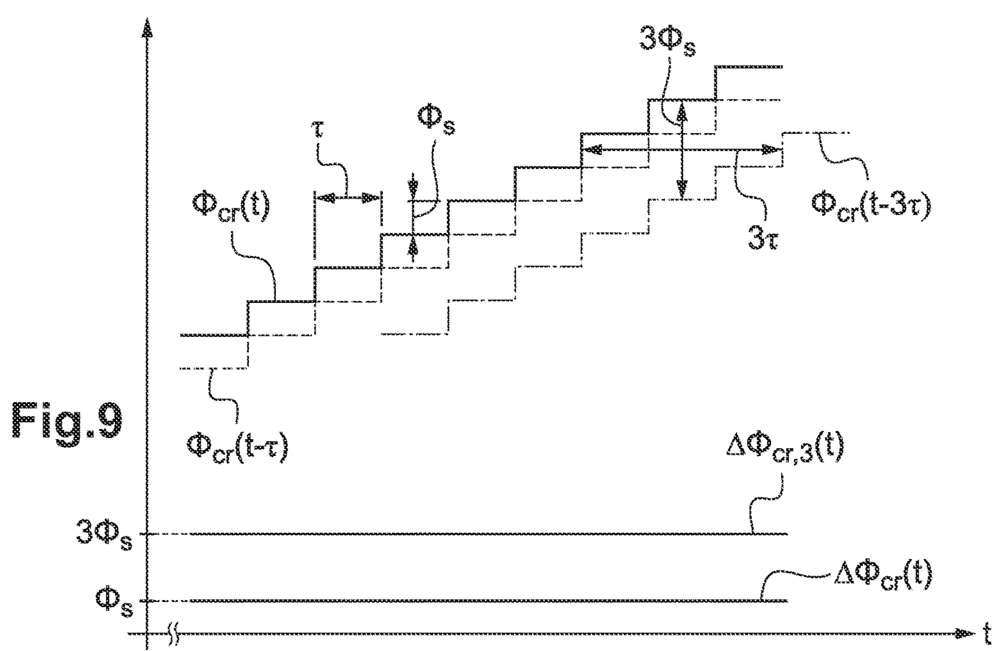
FIG. 9 shows the counter-reaction phase shift modulation used in the interferometric measurement device of FIG. 3.

Advantageously, the counter-reaction phase-shift component $\phi_{cr}$ is a modulation, as a function of time t, in stair steps of duration $\tau$ and of height $\phi_s$ such as that shown in FIG. 9.

Such a counter-reaction phase-shift component (I), introduces, between two light waves propagating in a counter-propagating way in the SAGNAC interferometer 110, a counter-reaction phase difference $\Delta\phi_{cr}(t)=\phi_{cr}(t)-\phi_{cr}(t-\tau)$ as shown in FIG. 9, the counter-reaction phase difference $\Delta\phi_{cr}(t)$ compensating for the non-reciprocal phase difference introduced between these two light waves by the rotation of the SAGNAC interferometer 110. The height $\phi_s$ of the steps is adjusted as a function of time so as to compensate at each time instant this non-reciprocal phase difference.

For two light waves propagating in a counter-propagating way in a SAGNAC interferometer, between its input port and its output port, the duration $\tau$ of the stair steps is linked to the time of propagation taken by these light waves to perform a travel in this SAGNAC interferometer.

Generally, with the two transmitted light waves 101-1, 102-1 having travelled in opposite directions through the SAGNAC interferometer 110, after a single passage in the ring resonator 1143, is associated a time of propagation $\tau_{g,1}$, called hereinafter time of propagation of the first passage, which is equal to $n_{opt}*L_1/c$.

By iteration, it is understood that the time of propagation $\tau_{g,2}$ of the second passage is equal to $n_{opt}*L_2/c$, that the time of propagation $\tau_{g,3}$ of the third passage is equal to $n_{opt}*L_3/c$, etc. . . . . .

Hence, in the general case, the time of propagation $\tau_{g,k}$ of the k-th passage is equal to $n_{opt}*L_k/c$.

In this first embodiment, the total length $L_k$ travelled through after the k-th passage being such that $L_k=k*L=k*L_1$ (see hereinabove), the time of propagation $\tau_{g,k}$ of the k-th passage fulfils the following relation: $\tau_{g,k}=k*\tau_{g,1}$.

Preferably, the duration $\tau$ of the stair steps is adjusted so that it is equal to the time of propagation $\tau_{g,1}$ of the first passage, i.e. $\tau=n_{opt}*L_1/c$.

Now, in this first embodiment, it has been seen that the total length $L_1$ travelled through after a passage in the ring resonator 1143 was approximately equal to the length L of the first fibre-optic coil 1144, i.e. $L_1 \approx L$.

Hence, the time of propagation $T_v$ of the first passage is herein such that $\tau_{g,1} \approx n_{opt}*L/c$.

This characteristic time of propagation, which is function of the length L of the first coil 1144, will be noted $\tau_g(L)=n_{opt}*L/c$.

Hence, in this first embodiment, the counter-reaction phase-shift component (I), is a stair-step modulation of duration $\tau_g(L)$, function of the length L of the first fibre-optic coil 1144.

When the SAGNAC interferometer 110 is in rotational movement, the transmitted light waves 101-1, 102-1 having performed a travel in opposite directions through the SAGNAC interferometer 110 after a passage in the ring resonator 1143 are phase-shifted so that, by SAGNAC effect, a non-reciprocal phase difference $\Delta\phi_{p,1}$ is introduced between these two transmitted light waves 101-1, 102-1.

In the general case, the non-reciprocal phase difference $\Delta\phi_{p,k}$ introduced between the two transmitted light waves **101-*k*, 102-*k* after the k-th passage, i.e. after having circulated k times in the ring resonator 1143**, is k times greater, i.e. $\Delta\phi_{p,k}=k*\Delta\phi_{p,1}$.

Also preferably, the height $\phi_s$ of the stair steps (see FIG. 9) is equal to the non-reciprocal phase difference $\Delta\phi_{p,1}$ of the first passage, i.e. $\phi_s=\Delta\phi_{p,1}$.

That way, the transmitted light waves 101-1, 102-1 having performed a travel in opposite directions through the SAGNAC interferometer 110 after a passage in the ring resonator 1143, are modulated by the counter-reaction modulation $\phi_{cr}$ so that the step $\phi_s$ compensate for the rotation of the SAGNAC interferometer 110 for these two transmitted light waves 101-1, 102-1.

Moreover, as shown in FIG. 9, in the case k=3, the transmitted light waves **101-*k*, 102-*k* having performed a travel through the SAGNAC interferometer 110 after k passages in the ring resonator 1143**, are also efficiently modulated by this counter-reaction modulation $\phi_{cr}$.

Indeed, the time of propagation $\tau_{g,k}$ after k passages being k times greater than the time of propagation $\tau_{g,1}$ after one passage, the stair steps are offset by a duration equal to $k*\tau_g(L)$ (see the modulation $\phi_{cr}(t-k*\tau)=\phi_{cr}(t-3*\tau_g(L))$ in FIG. 9 with k=3). The counter-reaction phase-difference modulation $\Delta\phi_{cr,3}(t)$ then introduced between the two transmitted light waves 101-3, 102-3 having circulated three times in the ring resonator 1143 is then such that: $\Delta\phi_{cr,3}(t)=\phi_{cr}(t)-\phi_{cr}(t-3*\tau_g(L))=3*\phi_s=3*\Delta\phi_{p,1}=\Delta\phi_{p,3}$. It hence efficiently compensates for the non-reciprocal phase difference $\Delta\phi_{p,3}$ generated between the two transmitted light waves 101-3, 102-3 by the rotation of the SAGNAC interferometer 110.

The so-chosen counter-reaction modulation $\phi_{cr}$, with stair steps of duration $\tau=\tau_{g,1}$ and height $\phi_s=\Delta\phi_{p,1}$, modulates all the transmitted light waves 101-1, 101-2, 101-3, **101-*k*, 102-1, 102-2, 102-3, 102-*k* after a travel through the SAGNAC interferometer 110. The resulting light waves 101, 102 are hence efficiently modulated and the working point of the SAGNAC interferometer 110** is correctly brought back towards the zero.

In a particularly advantageous embodiment, the modulation phase-shift $\phi_m$ has also a biasing phase-shift component $\phi_b$, which is periodic of biasing frequency of modulation $f_b$, intended to move the working point of the SAGNAC interferometer 110 from the maximum of the response curve in optical power (FIG. 8).

Generally, for two light waves propagating in a counter-propagating way in a SAGNAC interferometer, between its input port and its output port, a proper frequency of the SAGNAC interferometer can be defined, which is linked to the time of propagation taken by these light waves to perform a travel through this SAGNAC interferometer.

In other words, this proper frequency is linked to the total length travelled through by these two counter-propagative light waves during a travel through the SAGNAC interferometer.

By analogy, with the two transmitted light waves 101-1, 102-1 having travelled in opposite directions through the SAGNAC interferometer 110, after a single passage in the ring resonator 1143, is associated a proper frequency $f_{p,1}$, called the proper frequency of the first passage, equal to $c/(n_{opt}*L_1)$.

By iteration, it is understood that the proper frequency of the second passage $f_{p,2}$ is equal to $c/(n_{opt}*L_2)$, that the proper frequency of the third passage $f_{p,3}$ is equal to $c/(n_{opt}*L_3)$, etc. . . . .

Hence, in the general case, the proper frequency of the k-th passage $f_{p,k}$ is equal to $c/(n_{opt}*L_k)$ for this first embodiment.

Advantageously, the biasing modulation frequency $f_b$ is equal to the proper frequency of the first passage $f_{p,1}$.

The transmitted light waves 101-1, 102-1 are hence efficiently modulated at the proper frequency of the first passage $f_{p,1}$.

Now, in this first embodiment, it has been seen that the total length $L_1$ travelled through after a passage in the ring resonator 1143 was approximately equal to the length L of the first fibre-optic coil 1144, i.e. $L1 \approx L$.

Hence, the proper frequency of the first passage $f_{p,1}$ is such that $f_{p,1} \approx c/(n_{opt}*L)$.

This characteristic proper frequency, which is function of the length L of the first coil 1144, will be noted $f_p(L)=c/(n_{opt}*L)$.

Hence, in this first embodiment, the biasing phase-shift component $\phi_b$ is periodic at the proper frequency $f_p(L)$, which is function of the length L of the first fibre-optic coil 1144.

Moreover, as in this first embodiment, it has been shown that the total length $L_k$ travelled through after the k-th passage was such that $L_k=k*L=k*L_1$, the proper frequency $f_{p,k}$ of the k-th passage fulfils the following relation: $k*f_{p,k}=f_{p,1}=f_p(L)$.

Now, the biasing phase-shift component $\phi_b$ generates, between the two transmitted light waves **101-*k*, 102-*k*** after the k-th passage, a biasing phase difference component $\Delta\phi_{b,k}(t)$.

This biasing phase difference component $\Delta\phi_{b,k}(t)$, which is such that $\Delta\phi_{b,k}(t)=\phi_b(t)-\phi_b(t-1/f_{p,k})=\phi_b(t)-\phi_b(t-k*1/f_p(L))$, is:

- maximum if the biasing modulation frequency $f_b$ is equal to the proper frequency $f_{p,k}$ of the k-th passage ($f_b=f_{p,k}$) or to one of its odd multiples ($f_b=3*f_{p,k}$, $5*f_{p,k}$, etc. . . . ), and
- zero if the biasing modulation frequency $f_b$ is equal to an even multiple of the proper frequency $f_{p,k}$ ($f_b=2*f_{p,k}$, $4*f_{p,k}$, etc. . . . ).

The transmitted light waves having performed an odd number of passages (case k=1, 3, 5, etc. . . . ) are hence efficiently modulated by the modulation chain, whereas the transmitted light waves having performed an even number of passages (case k=2, 4, 6, etc. . . . ) are not modulated.

Consequently, the first and second light waves 101, 102 being the superimposition of the different transmitted light waves 101-1, 101-2, 101-3, etc. . . . , 102-1, 102-2, 102-3, etc. . . . , only half the electric signal delivered by the detector 104 is biased.

In order to correct this defect and to collect the totality of the useful electric signal delivered by the detector by modulating efficiently all the light waves circulating in the SAGNAC interferometer after one or several passages, it is advantageous to use a second fibre-optic coil in the ring resonator of the SAGNAC interferometer.

It has hence been shown in FIG. 10 a second embodiment of the interferometric measurement device 200, in which the ring resonator 1143 of the SAGNAC interferometer 210 comprises a second fibre-optic coil 2144.

Advantageously, the optical fibre used for the second coil 2144 is identical to that used for the first coil 1144.

Preferably, the second coil 2144 is of same length as the first coil 1144, i.e. of length L.

Moreover, the second fibre-optic coil 2144 has preferably the same surface and the same symmetrical winding as the first fibre-optic coil 1144.

As shown in FIG. 10, the first fibre-optic coil 1144 and the second fibre-optic coil 2144 are arranged on each side of the ring resonator 1143 of the SAGNAC interferometer 210, the first coil 1144 in the first half and the second coil 2144 in the second half.

So-arranged, the first coil 1144 and the second coil 2144 are separated on each side by the first coupler 1141 and the second coupler 1142.

As for the first embodiment, in practice, the length L of the second coil 2144 is very longer, for example one hundred times greater, than the remaining portions 1143B1, 1143B2 of optical fibre (see FIG. 10) of the ring resonator 1143, which are located in the second portion 1143B of the ring resonator 1143, between the first coupler 1141 and the second coil 2144 and between the second coupler 1142 and the second coil 2144, respectively.

Hence, generally, the length $L_B$ of the second portion 1143B of the ring resonator 1143 is, in this second embodiment, very little different from (slightly higher than) the length L of the second fibre-optic coil 2144 located in this second portion 1143B, i.e. $L_B \approx L$.

Consequently, the total length $L_R = L_A + L_B$ of the resonator is likened, in this second embodiment, to twice the length L of the first fibre-optic coil 1144, i.e. $L_R = L_A + L_B \approx 2*L$.

Moreover, it will also be considered that in the second embodiment, the length L of the first fibre-optic coil 1144 is very longer than the total length L' of the first and second arms 111, 112 of the SAGNAC interferometer 110 (L>>L'), so that, in first approximation, the total length $L_1$ travelled through at the first passage can be likened, in this second embodiment, to the length L of the first fibre-optic coil 1144. Indeed, as seen hereinabove, the following relations are true: $L_1 = L_A + L' \approx L + L'$ because $L_A \approx L$, hence $L_1 \approx L$ because L>>L'.

By iteration, the total length $L_k$ travelled through after the k-th passage, in this second embodiment, fulfils the following relations:

$$L_k = L_A + (k-1)*L_R + L' \approx L + (k-1)*(2*L) \approx (2k-1)*L \approx (2k-1)*L_1$$

Hence, in this second embodiment, the proper frequency $f_{p,k}$ of the k-th passage fulfils the following relation: $(2k-1)*f_{p,k} = f_{p,1} = f_p(L)$.

Hence, using a biasing modulation component $\phi_b$, which is periodic at a biasing modulation frequency $f_b$ equal to the proper frequency $f_p(L)$, function of the length L of the first coil 1144 (and also of the second coil 2144) of the ring resonator 1143, the light waves 101, 102 having performed k passages are modulated by the modulation chain 120 at a biasing modulation frequency $f_b$ that is equal to an odd multiple of the proper frequency $f_{p,k}$ of the k-th passage.

Consequently, all the transmitted light waves 101-1, 101-2, 101-3, . . . , **101-*k* as well as 102-1, 102-2, 102-3, . . . , 102-*k* are correctly modulated and the whole electric signal delivered by the detector 104** is biased.

The measurement of the physical parameter $\Omega_R$ to be measured and the interferometric measurement device 200 in this second embodiment is hence more efficient.

Nevertheless, it remains a residual spurious signal due to the fact that, rigorously, the proper frequency $f_{p,k}$ of the k-th passage does not fulfil exactly the relation $(2k-1)*f_{p,k} = f_p(L)$ (see hereinabove).

Indeed, the lengths of the arms 111, 112 of the SAGNAC interferometer 210 must be taken into account for the determination of the total length $L_k$ travelled through after the k-th passage.

Moreover, to further increase the performances of the interferometric measurement device, it is possible to adjust the total length $L_R$ of the ring resonator so as to take into account the total length L' of the arms of the SAGNAC interferometer.

It has hence been shown in FIG. 11 a third embodiment of the interferometric measurement device 300 in which the ring resonator 1143 comprises, in addition to the first and second coils 1144, 2144 of length L, two additional portions 3151, 3152 of optical fibre, preferably identical to the optical fibre used for said coils 1144, 2144.

These additional portions 3151, 3152 have for function to adjust the ratio of the times of propagation $\tau_g$ between the different light waves 101, 102 having performed a travel in opposite directions through the SAGNAC interferometer 310 after one or several passages in the ring resonator 1143.

As shown in FIG. 11, the two additional portions 3151, 3152 are arranged on either side of the second coil 2144, between this second fibre-optic coil 2144 and one of the two couplers 1141, 1142 of the ring resonator 1143.

Preferably, in this third embodiment, the sum of the lengths of the additional portions 3151, 3152 is equal to 2*L'.

With the same approximations on the remaining portions 1143A1, 1143A2, 1143B1, 1143B2 as for the first and second embodiments (see FIGS. 3 and 10), and taking into account, in this third embodiment, the total length L' of the arms of the SAGNAC interferometer 310 and the sum of the lengths of the additional portions 3151, 3152 equal to 2*L', the following relations are shown for the total length $L_R$ of the ring resonator 1143 and the total length $L_k$ travelled through at the k-th passage:

$$L_R = L_A + L_B \approx 2*(L+L'), \text{ as } L_A \approx L \text{ and } L_B \approx L + 2*L'$$

$$L_k = L_A + (k-1)*L_R + L' \approx L + 2*(k-1)*(L+L') + L' = (2k-1)*(L+L')$$

In particular, the total length $L_1$ travelled through at the first passage is equal to L+L', so that there is the same relation as for the second embodiment, i.e.: $L_k = (2k-1)*L_1$.

Consequently, using a biasing modulation component $\phi_b$, which is periodic at a biasing proper frequency $f_b$ equal to the proper frequency $f_p(L+L') = f_{p,1}$, function of the length L+L' equal to the total length $L_1$ of the first passage in the ring resonator 1143, the transmitted light waves 101-*k*, 102-*k* having performed k passages are modulated by the modulation chain at a biasing modulation frequency $f_b$ that is equal to an odd multiple of the proper frequency $f_{p,k}$ of the k-th passage.

Consequently, all the transmitted light waves 101, 102 are correctly modulated and the whole electric signal delivered by the detector 104 is biased.

The measurement of the physical parameter $\Omega_R$ to be measured is better and the interferometric measurement device 300 in this third embodiment is even more efficient.

II will finally be noted that the counter-reaction modulation $\phi_{cr}$ (see FIG. 9) used in the first embodiment, with a duration $\tau$ of the stair steps equal to the time of propagation $\tau_{g,1}$ of the first passage and with a step height $\phi_s$ equal to the non-reciprocal phase difference $\Delta\phi_{p,1}$ of the first passage, may also be used in the second and third embodiments, with similar results.

The invention claimed is:

1. A fibre-optic interferometric measurement device intended to measure a physical parameter and comprising:

a wide-spectrum light source emitting a source light signal, a fibre-optic SAGNAC interferometer, in which propagate a first light wave and a second light wave, which are counter-propagating, said SAGNAC interferometer comprising:

an input port receiving, in a forward direction, an input light signal, a splitter connected to said input port and, respectively, to a first arm and to a second arm of said SAGNAC interferometer, measurement means sensitive to said physical parameter to be measured, said physical parameter generating a non-reciprocal phase difference $\Delta\phi_p$, which is function of said physical parameter, between said two counter-propagating light waves, and an output port, common with said input port, transmitting, in a return direction opposite to the forward direction, an output light signal having an output light power $P_{OUT}$ that is function of the total phase difference $\Delta\phi_t$ between said two counter-propagating light waves, an optical radiation detector, receiving said output light power $P_{OUT}$ exiting from said SAGNAC interferometer and delivering an electric signal representative of the output light power $P_{OUT}$ and of the physical parameter to be measured, and a source coupler that couples, in said forward direction, said light source to said input port of the SAGNAC interferometer, and in said return direction, to said output port of the SAGNAC interferometer to said detector, wherein said measurement means of the SAGNAC interferometer include a transmission-mode fibre-optic ring resonator, said ring resonator comprising a first coupler, respectively a second coupler, which couples the first arm, respectively the second arm, of said SAGNAC interferometer to said ring resonator, so that said first and second light waves in said ring resonator circulate in opposite directions of circulation, and wherein said ring resonator comprises at least one first fibre-optic coil of length L located in a first portion of the ring resonator, between said first coupler and said second coupler.

2. The interferometric measurement device according to claim 1, wherein said ring resonator comprises a second fibre-optic coil, of same length as the first fibre-optic coil, located in a second portion of said ring resonator, said first and second fibre-optic coils being separated by said first coupler and said second coupler.

3. The interferometric measurement device according to claim 2, wherein said ring resonator comprises two additional portions of optical fibre, whose length sum is equal to 2L', L' being the sum of the lengths of said first and second arms of the SAGNAC interferometer determined between said splitter and said first and second couplers, respectively, said two additional portions being arranged on either side of said second fibre-optic coil, between said second coil and one of said first and second couplers.

4. The interferometric measurement device according to claim 1, including a modulation chain adapted to modulate said output light power $P_{OUT}$ exiting from said SAGNAC interferometer, said modulation chain comprising a phase modulator arranged at the splitter, in the first and the second arms of the SAGNAC interferometer, to introduce, between said forward direction and said return direction, a modulation phase-shift $\phi_m$ on each of said first and second light waves propagating in said first and second arms.

5. The interferometric measurement device according to claim 1, including a modulation chain adapted to modulate said output light power $P_{OUT}$ exiting from said SAGNAC interferometer, said modulation chain comprising a phase modulator arranged at the splitter, in the first and the second arms of the SAGNAC interferometer, to introduce, between said forward direction and said return direction, a modulation phase-shift $\phi_m$ on each of said first and second light waves propagating in said first and second arms.

6. The interferometric measurement device according to claim 2, including a modulation chain adapted to modulate said output light power $P_{OUT}$ exiting from said SAGNAC interferometer, said modulation chain comprising a phase modulator arranged at the splitter, in the first and the second arms of the SAGNAC interferometer, to introduce, between said forward direction and said return direction, a modulation phase-shift $\phi_m$ on each of said first and second light waves propagating in said first and second arms.

7. The interferometric measurement device according to claim 3, including a modulation chain adapted to modulate said output light power $P_{OUT}$ exiting from said SAGNAC interferometer, said modulation chain comprising a phase modulator arranged at the splitter, in the first and the second arms of the SAGNAC interferometer, to introduce, between said forward direction and said return direction, a modulation phase-shift $\phi_m$ on each of said first and second light waves propagating in said first and second arms.

8. The interferometric measurement device according to claim 5, wherein said modulation phase-shift $\phi_m$ has a biasing phase-shift component $\phi_b$, which is periodic at a proper frequency $f_p(L)$, function of the length L of said first fibre-optic coil.

9. The interferometric measurement device according to claim 6, wherein said modulation phase-shift $\phi_m$ has a biasing phase-shift component $\phi_b$, which is periodic at a proper frequency $f_p(L)$, function of the length L of said first fibre-optic coil.

10. The interferometric measurement device according to claim 7, wherein said modulation phase-shift $\phi_m$ has a biasing phase-shift component $\phi_b$, which is periodic at a proper frequency $f_p(L)$, function of the length L of said first fibre-optic coil.

11. The interferometric measurement device according to claim 7, wherein said modulation phase-shift $\phi_m$ has a biasing phase-shift component $\phi_b$, which is periodic at a proper frequency $f_p(L+L')$, function of the length L+L'.

12. The interferometric measurement device (100) according to claim 4, wherein said modulation phase-shift $\phi_m$ has a counter-reaction phase-shift component $\phi_r$, which is a stair-step modulation of duration $\tau_g(L)$, function of the length L of said first fibre-optic coil.

13. The interferometric measurement device (100) according to claim 5, wherein said modulation phase-shift $\phi_m$ has a counter-reaction phase-shift component $\phi_r$, which is a stair-step modulation of duration $\tau_g(L)$, function of the length L of said first fibre-optic coil.

14. The interferometric measurement device (100) according to claim 8, wherein said modulation phase-shift $\phi_m$ has a counter-reaction phase-shift component $\phi_r$, which is a stair-step modulation of duration $\tau_g(L)$, function of the length L of said first fibre-optic coil.

15. The interferometric measurement device (100) according to claim 11, wherein said modulation phase-shift $\phi_m$ has a counter-reaction phase-shift component $\phi_r$, which is a stair-step modulation of duration $\tau_g(L)$, function of the length L of said first fibre-optic coil.

16. A gyrometer including an interferometric measurement device according to claim 1, the physical parameter to be measured being a component of the rotational speed of said gyrometer about an axis of rotation, the variation of the non-reciprocal phase difference $\Delta\phi_p$ being produced by the physical parameter to be measured by SAGNAC effect.

17. An electric current or magnetic field sensor including an interferometric measurement device according to claim 1, the variation of the non-reciprocal phase difference $\Delta\phi_p$ being produced by the physical parameter to be measured by FARADAY effect.

* * * * *